US012576936B2

(12) United States Patent
Loveland et al.

(10) Patent No.: US 12,576,936 B2
(45) Date of Patent: Mar. 17, 2026

(54) VEHICLE WITH SPHERICAL WHEELS

(71) Applicant: Early Rider Limited, Stockbridge (GB)

(72) Inventors: Andrew Loveland, Henley On Thames (GB); Jeffrey Knapman, Salisbury (GB); Robert Upton, Totnes (GB)

(73) Assignee: Early Rider Limited, Lockerley (GB)

( * ) Notice: Subject to any disclaimer, the term of this patent is extended or adjusted under 35 U.S.C. 154(b) by 505 days.

(21) Appl. No.: 18/016,619

(22) PCT Filed: Jul. 16, 2021

(86) PCT No.: PCT/GB2021/051831
§ 371 (c)(1),
(2) Date: Jan. 17, 2023

(87) PCT Pub. No.: WO2022/013568
PCT Pub. Date: Jan. 20, 2022

(65) Prior Publication Data
US 2023/0294786 A1 Sep. 21, 2023

(30) Foreign Application Priority Data
Jul. 17, 2020 (GB) ..................................... 2011081

(51) Int. Cl.
*B62K 9/00* (2006.01)
*B60B 19/14* (2006.01)
(Continued)

(52) U.S. Cl.
CPC ................ *B62K 9/00* (2013.01); *B60B 19/14* (2013.01); *B62K 3/02* (2013.01); *B62K 21/12* (2013.01)

(58) Field of Classification Search
CPC ............ B62K 9/00; B62K 3/02; B62K 21/12; B60B 19/14
See application file for complete search history.

(56) References Cited

U.S. PATENT DOCUMENTS

| | | | |
|---|---|---|---|
| 2,787,970 A | 4/1957 | Bennett | |
| 3,152,813 A | 10/1964 | Brown | |

(Continued)

FOREIGN PATENT DOCUMENTS

| | | |
|---|---|---|
| BE | 893233 A | 9/1982 |
| CA | 965813 A | 4/1975 |

(Continued)

OTHER PUBLICATIONS

EP Office Action for EP Patent Application No. 21749870.8 dated Jun. 25, 2025.

(Continued)

*Primary Examiner* — John Olszewski
(74) *Attorney, Agent, or Firm* — Getz Balich LLC

(57) ABSTRACT

A vehicle includes a frame, a front ground-engaging sphere, a rear ground-engaging sphere, and gripping portions for a rider to hold. The front sphere is rotatable about a first axis which is transverse and fixed relative to the frame and the rear sphere is rotatable about a plurality of axes. The vehicle also includes a support, which is connected pivotally to a rear portion of the frame. The rear sphere is connected to the support for rotation about a second axis which is transverse and fixed relative to the support. The support is pivotal with respect to the frame about a third axis which extends downwardly and longitudinally of the vehicle, such that the support is pivotable through a range of positions including a neutral position wherein the first and second axes are parallel. The vehicle further includes a resilient biasing mechanism configured to resiliently bias the support towards the neutral position.

18 Claims, 8 Drawing Sheets

(51) Int. Cl.
    *B62K 3/02*       (2006.01)
    *B62K 21/12*     (2006.01)

(56)        References Cited

U.S. PATENT DOCUMENTS

| | | | |
|---|---|---|---|
| 3,379,454 A | 4/1968 | Woodman | |
| 3,401,421 A | 9/1968 | Aninger | |
| 3,695,626 A | 10/1972 | Alexander, Jr. | |
| 3,794,351 A | 2/1974 | Cudmore | |
| 4,150,838 A | 4/1979 | Lappage | |
| 4,225,147 A | 9/1980 | Lowery | |
| 4,799,702 A | 1/1989 | Wang | |
| 5,288,092 A | 2/1994 | Miller | |
| 5,409,265 A | 4/1995 | Douglass | |
| 5,826,674 A | 10/1998 | Taylor | |
| 6,568,695 B2 | 5/2003 | Dornan | |
| 6,802,381 B1 | 10/2004 | Koors | |
| 8,028,775 B2 | 10/2011 | Orenbuch | |
| 8,226,095 B2 | 7/2012 | Reyes, Jr. | |
| 8,226,096 B2 | 7/2012 | Reyes, Jr. | |
| 8,342,546 B2 | 1/2013 | Bryant | |
| 8,459,667 B2 | 6/2013 | Ungar | |
| 8,864,150 B2 | 10/2014 | Loveland | |
| 10,040,502 B2 | 8/2018 | Loveland | |
| D973,141 S | 12/2022 | Loveland | |
| 2002/0070514 A1 | 6/2002 | Ronald, Jr. | |
| 2003/0001352 A1 | 1/2003 | Dornan | |
| 2003/0034622 A1 | 2/2003 | Van Ardenne | |
| 2004/0080139 A1* | 4/2004 | Kettler | B62K 9/02 |
| | | | 280/267 |
| 2008/0283311 A1 | 11/2008 | Li | |
| 2010/0270772 A1 | 10/2010 | Webb | |
| 2011/0148063 A1 | 6/2011 | Reyes, Jr. | |
| 2011/0233885 A1 | 9/2011 | Mcmillan | |
| 2012/0043734 A1* | 2/2012 | Loveland | B62K 9/00 |
| | | | 280/87.041 |
| 2014/0217694 A1* | 8/2014 | Fitzwater | B62K 9/00 |
| | | | 280/210 |
| 2016/0129965 A1 | 5/2016 | Baron | |
| 2016/0152296 A1* | 6/2016 | Eckert | B62K 21/12 |
| | | | 280/87.041 |
| 2018/0312210 A1* | 11/2018 | Kogure | B62K 9/00 |
| 2019/0143749 A1* | 5/2019 | Panter | B60B 33/0078 |
| | | | 16/26 |

FOREIGN PATENT DOCUMENTS

| | | |
|---|---|---|
| CN | 2190073 Y | 2/1995 |
| CN | 202345861 U | 7/2012 |
| CN | 205971659 U | 2/2017 |
| CN | 106794882 B | 6/2019 |
| CN | 306241723 S | 12/2020 |
| DE | 102018009785 A1 | 6/2020 |
| EM | 008052674-0001 | 7/2020 |
| EM | 008052674-0002 | 7/2020 |
| EM | 008052674-0003 | 7/2020 |
| EM | 008052674-0004 | 7/2020 |
| EM | 008052674-0005 | 7/2020 |
| GB | 1598691 A | 9/1981 |
| GB | 2190635 A | 11/1987 |
| GB | 2529387 A | 2/2016 |
| JP | 2010202154 A | 9/2010 |
| NL | 1007245 C1 | 4/1999 |
| TW | M553648 U | 1/2018 |
| WO | 2011075497 A2 | 6/2011 |
| WO | 2012104622 A2 | 8/2012 |
| WO | 2014080166 A1 | 5/2014 |
| WO | WO-2016009184 A1 * | 1/2016 ............... B62K 9/00 |

OTHER PUBLICATIONS

Chinese Office Action for CN Patent Application No. 202180049895.6 dated May 31, 2025.

\* cited by examiner

VEHICLE WITH SPHERICAL WHEELS

This application is entitled to the benefit of, and incorporates by reference essential subject matter disclosed in PCT Application No. PCT/GB2021/051831 filed on Jul. 16, 2021, which claims priority to GB Patent Appln. No. 2011081.3 filed Jul. 17, 2020, which are hereby incorporated by reference in their entireties.

BACKGROUND OF THE INVENTION

1. Technical Field

This invention relates to a vehicle. More particularly, but not exclusively, the invention relates to a vehicle which can be propelled by a person sitting on the vehicle with the person's feet engaging the ground.

2. Background Information

There are known vehicles of this type which are bicycles. The person's feet are used to push the bicycle along, rather than pedals. Such bicycles are sometimes referred to as "balance bikes". The rider can develop a sense of balance without the complication of using pedals, and can learn to coast for distances with both feet raised off of the ground. Typically, a balance bike will have handlebars which can be used to turn the front wheel so that the bike can be steered.

Particularly in the case of very young children, typically up to about two years old, a conventional balance bike can be too difficult to control. In PCT Patent Application WO 2010/116126 there is disclosed a vehicle for use by a young child, in which the front and rear wheels are replaced by spheres, both of which are rotatable about three orthogonal axes. The feet of the rider engage the ground and the vehicle is propelled along the ground by the rider's feet. There is a transverse handle for the rider to hold, but this is fixed and does not serve to steer the vehicle. Instead, steering is controlled by use of the rider's feet on the ground and by the rider shifting weight. Whatever direction the rider chooses to move in, the spheres will rotate about whatever axis is necessary, to accommodate the change in direction.

To simplify use of vehicle of this type, in PCT Patent Application WO 2012/104622 there is disclosed a modification in which only the rear sphere is rotatable about three orthogonal axes. The front sphere is rotatable about a single transverse axis. Again, there is a transverse handle for the rider to hold, but this is fixed and does not serve to steer the vehicle; and steering is controlled by use of the rider's feet on the ground and by the rider shifting weight.

Another vehicle, described in WO 2016/009184, is provided with front and rear ground-engaging spheres, where the rear ground-engaging sphere is mounted on the vehicle via a support such that the sphere can rotate about a plurality of axes. The support is connected pivotally to the frame and extends longitudinally and downwardly of the frame. This configuration advantageously provides a passive steering mechanism that can assist young riders (e.g. young children) in developing the motor skills necessary for ride-on vehicles such as bicycles.

SUMMARY

The present invention seeks to provide an improved vehicle having spherical wheels. It is an aim of the present invention to change the steering characteristics of such a vehicle.

When viewed from a first aspect, the invention provides a vehicle comprising: a frame; a front ground-engaging sphere which is rotatable about a first axis which is transverse and fixed relative to the frame; a rear ground-engaging sphere which is rotatable about a plurality of axes; gripping portions connected to a front portion of the vehicle, for a rider to hold; and a support, wherein the support is connected pivotally to a rear portion of the frame and wherein the rear sphere is connected to the support for rotation about a second axis which is transverse and fixed relative to the support; wherein the support is pivotal with respect to the frame about a third axis which extends downwardly and longitudinally of the vehicle, such that the support is pivotable through a range of positions, said range of positions including a neutral position wherein the first and second axes are parallel; and wherein the vehicle further comprises a resilient biasing mechanism configured to resiliently bias the support towards the neutral position.

It will be appreciated that the vehicle defines a longitudinal axis extending between the front and rear ground-engaging spheres. The frame may generally lie along this longitudinal axis, but having any suitable shape. The first and second axes are transverse to the longitudinal axis. In at least some embodiments, preferably the support is oriented such that an axis of the support projects longitudinally and downwardly of the vehicle, where said axis is defined as being perpendicular to the second axis and extending from a point of connection of the support on the frame to the second axis. However, as will be described further below, the support may take a variety of forms and shapes rather than being an elongate support member of the type commonly known for bicycle wheel forks or seen in WO 2016/009184 as curving around a spherical wheel.

In order to assist with the support pivoting about the third axis to change the rotational axis of the rear ground-engaging sphere relative to the frame, in a set of embodiments, the third axis extends downwardly and forwardly from the point of connection of the support to the frame. In at least some embodiments, preferably the support is oriented such that an axis of the support projects forwardly and downwardly of the vehicle, where said axis is defined as being perpendicular to the second axis and extending from the point of connection of the support on the frame to the second axis. As mentioned above, the support may take a variety of forms and shapes.

In some embodiments, the vehicle of the present invention uses, and thereby develops, the rider's intuitive sense of balance and directional motion as the rider moves and directs the vehicle. In particular, the configuration of the vehicle and axes about which the rear sphere can rotate may advantageously cause the vehicle to automatically correct for a loss of balance of the rider, as described below. This may be particularly advantageous for very young riders, e.g. children up to around two years old, who are only starting to develop a connection between their senses and their motor system.

When a child riding the vehicle loses balance and starts to fall, the vehicle leans to one side—for example, to the right. When the vehicle leans to the right, the right hand side of the rear sphere comes into contact with the ground, resulting in a frictional force from the ground on the rear sphere that is off-center (i.e. it is not in line with the plane containing a central, longitudinal axis of the frame). This off-center frictional force causes a torque on the rear sphere, causing it to rotate about the third axis (i.e. the support pivots about the third axis). In, for example, embodiments in which the third axis extends forwardly of the vehicle, this turns the rear sphere to the right, i.e. in the direction of the fall, effectively driving the rear sphere under the falling frame. As the axle of the rear sphere is no longer perpendicular to the direction of travel, the rear sphere presents an obstacle to the forward momentum of the frame and rider. As a result, the rider's momentum causes the frame and the rider to be lifted up and over the sphere, effectively helping to return the frame and rider to an upright position. This automatic correction of a fall gives the young rider a few extra moments to make the connection between their senses and their motor system, and subsequently to co-ordinate a response that keeps them balanced (e.g. by shifting their body weight).

Once the rider has regained their balance and brought the vehicle upright, the frictional force is centered again, and the rear sphere reverts to the neutral position (wherein the first and second axes are parallel) and the rider continues to propel the vehicle forward.

Additionally, or alternatively, a vehicle in accordance with the present invention may allow a rider to steer the vehicle using their body weight. In the case of a sit-on vehicle that is propelled by the rider's feet engaging the ground, when the rider wishes to propel the vehicle forward, the rider simply pushes backwards with their feet against the ground causing the vehicle to move forward as the spheres rotate about their transverse axes. The configuration of the vehicle causes it to respond to the rider's intention to turn by responding to changes in the rider's body position. For example, the rider may cause the support and rear sphere to rotate about the third axis by leaning their body weight, causing the support to rotate. The rotation of the support results in the first and second axes no longer being parallel, so the vehicle follows a turning circle as the rider propels it forward. When the rider wishes to move forwards in a straight line, they bring their body upright, and the rear sphere and support revert to the neutral position, i.e. such that the first and second axes are parallel, and the vehicle moves straight forward as it is propelled by the rider's feet.

The Applicant has appreciated that these benefits and uses can be enhanced by providing the vehicle with a resilient biasing mechanism that resiliently biases the support to the neutral position. Such a mechanism enables the rear sphere to return more readily towards the neutral position as the rider brings the vehicle upright, assisting them as they aim to steer the vehicle in a straight line. It also provides some resilient resistance to the turning of the support, e.g. as the rider leans to turn the vehicle. For example, the resilient biasing mechanism could be manufactured with a chosen resilience to determine how much and/or how easily the support turns in response to a torque caused by tilting of the vehicle, which may provide an improved riding experience.

In a set of embodiments, the resilient biasing mechanism is configured to apply a biasing force to the support towards the neutral position, wherein the resilient biasing mechanism is adjustable to change a rate at which a magnitude of the biasing force increases with angular displacement of the support as the support rotates about the third axis. The adjustability of the resilient biasing mechanism allows the steering characteristics to be adjusted, e.g. to suit the experience and ability of the rider.

It will be appreciated from the present disclosure that the rate at which the magnitude of the biasing force increases with angular displacement of the support affects how much force is required to turn the support (and thus to turn the rear ground-engaging sphere), e.g. how much force is required to turn the support to a given angular rotation relative to the neutral position, as well as affecting the magnitude of the force urging the support back to the neutral position, e.g. at a given angular rotation relative to the neutral position.

Thus, if the resilient biasing mechanism is adjusted to increase the rate at which the magnitude of the biasing force increases with angular displacement of the support, the rear sphere may be turned less readily, and may move back to the neutral position more readily. This can be used to effectively stiffen the steering. In some examples, this can be used to allow a beginner rider to focus on straight forward and backward motion. In some other examples, this can assist an experienced rider to achieve faster scooting speeds. Conversely, if the resilient biasing mechanism is adjusted to decrease the rate at which the magnitude of the biasing force increases with angular displacement of the support, the rear sphere may be turned more readily, and may move back to the neutral position less readily. This can be used to effectively loosen the steering and make it easier for a rider to change direction and steer the vehicle by shifting their body weight, for example as they progress from being a beginner rider to an experienced rider.

This adjustability of the resilient biasing mechanism may advantageously allow the vehicle to be adjusted to suit a rider, not only based on level of experience, but also e.g. to suit their age, height, weight, etc. For example, for a young or small rider, the resilient biasing mechanism may be adjusted to decrease the rate at which the magnitude of the biasing force increases with angular displacement of the support (i.e. so the rear sphere turns more readily). This may advantageously allow the young rider to benefit from the automatic correction of a loss of balance, as described above. As the rider grows older, taller and heavier, the resilient biasing mechanism may be adjusted to increase the rate at which the magnitude of the biasing force increases with angular displacement of the support (i.e. so the rear sphere requires more force to turn). This may provide an improve riding experience for the older rider as they grow more confident using their weight to turn the vehicle, and no longer require as much correction for loss of balance.

This may be particularly advantageous as it means that the child may be able to use the same vehicle over a longer period of time because it may be adjusted as they grow and in line with their developing skills. This may mean that the child does not 'outgrow' a vehicle so quickly, and may thus avoid the need to purchase multiple vehicles with different configurations to match the child's age and skills over a relatively short period of time.

However, it is not essential for the resilient biasing mechanism to be adjustable. In some embodiments the resilient biasing mechanism is configured to resiliently bias the support towards the neutral position with a fixed (e.g. predetermined) biasing force. The resilient biasing mechanism may be manufactured with a fixed resilience.

In a set of embodiments, the resilient biasing mechanism comprises a resilient member. The resilient biasing mechanism may be configured such that a pivotal movement of the support away from the neutral position applies a mechanical stress to the resilient member or increases a mechanical stress applied to the resilient member. Any reference herein to a mechanical stress applied to the resilient member may include one or more of a tensile stress, a compressive stress, a shear stress, a torsional stress and a bending stress. The mechanical stress may create or increase an elastic deformation of the resilient member. The elastic deformation may be an extension, compression, twist or bend. The resilient member may provide a reaction force opposing the torque that turns the support (when the rear sphere is tilting), serving to bias the support to the neutral position, e.g. owing to the resilient member's tendency to revert towards its equilibrium undeformed state.

The resilient member could comprise any suitable resilient structure or material. In some embodiments, the resilient member comprises a spring, e.g. a coil spring. In some other embodiments, the resilient member comprises an elastomeric member, for example a compressible elastomeric column.

The resilient biasing mechanism may comprise a single resilient member. The resilient member may be configured such that rotation of the support in either of a clockwise or anticlockwise direction away from the neutral position causes a force (e.g. due to linear motion of the translatable member) to be applied to the same resilient member, e.g. where the force acts in the same direction irrespective of the direction of rotation of the resilient member away from the neutral position.

This may provide an advantage in that a biasing force urging the support to the neutral position may be provided by the same resilient member, and thus for a given degree of rotation in either direction, the same magnitude of biasing force may be applied in response, so that vehicle is balanced with respect to the biasing force created in response to the support turning in either direction. This may be preferred over an arrangement comprising more than one resilient member, e.g. where a separate resilient member is provided for each direction of rotation (although such arrangements are possible within the scope of the invention). If, for example, an asymmetry were to develop in the two resilient members, e.g. over long-term use or storage, the vehicle may become unbalanced with respect to the biasing force created by the resilient biasing mechanism.

Having a single resilient member may provide further advantages. For example, it may more easily facilitate the provision of adjustability of the resilient biasing mechanism, as discussed above. For example, it may be more straightforward to provide means for adjusting the resilient biasing member by applying a preload to the resilient member when there is a single resilient member (compared with, for example, applying the same preload to more than one resilient member).

In a set of embodiments, the resilient biasing mechanism is adjustable to apply a preload mechanical stress to the resilient member or to change a preload mechanical stress, e.g. a preload tension or a preload compression, applied to the resilient member. In this context, a preload means that the resilient member is subject to a mechanical stress, e.g. it may be under tension or compression, when the support is in the neutral position.

In a set of embodiments, the resilient biasing mechanism is adjustable to a configuration in which a or the biasing force applied to the support has a magnitude that is sufficient to prevent any pivotal movement of the support. This may be understood to mean that the resilient biasing mechanism effectively holds the support rigidly with respect to the frame instead of allowing any resilient movement, e.g. so that any force applied in use by any rider will not cause the support to pivot around the third axis. This may advantageously allow the resilient biasing mechanism to be adjusted such that the rear sphere is prevented from turning. This configuration may be suitable for very young children, to allow them to focus on practicing straight forwards and backwards movement on the vehicle, as mentioned above. Later, once they have achieved some proficiency in forwards and backwards movement, the resilient biasing mechanism may be adjusted to allow the rear sphere to move readily, so that the rider can learn to turn the vehicle, with the resilient biasing mechanism providing the automatic correction of loss of balance, as already described above.

In a set of embodiments, the resilient biasing mechanism comprises a twistable portion for adjusting the resilient biasing mechanism. The resilient biasing mechanism may be configured such that changing an angular orientation of the twistable portion changes the rate at which the magnitude of a or the biasing force applied to the support increases with angular displacement of the support, by an amount corresponding to the change in angular orientation of the twistable portion. This may provide a convenient and unobtrusive means for a user (e.g. a parent of the rider) to manually adjust the resilient biasing mechanism. More generally, the resilient biasing mechanism could additionally or alternatively have a moveable portion (e.g. a slidable portion) for adjusting the resilient biasing mechanism. The resilient biasing mechanism may be configured such that change in a position (e.g. a displacement) of the moveable portion changes the rate at which the magnitude of the biasing force increases with angular displacement of the support by an amount corresponding to the change in position of the moveable portion.

The moveable or twistable portion may be configured to apply a mechanical stress to the resilient member or to increase a mechanical stress applied to the resilient member (e.g. to compress or extend it) so as to apply a preload mechanical stress thereto. The magnitude of the preload mechanical stress may correspond to an amount by which the moveable or twistable portion is rotated. The moveable or twistable portion may apply a preload mechanical stress to the resilient member via a cooperating moveable member, e.g. where rotation of the moveable or twistable portion causes the cooperating moveable member to move so as to apply a preload mechanical stress to the resilient member. For example, the twistable portion and the cooperating moveable member may be provided with corresponding threads such that rotating the twistable portion screws or unscrews the threads, causing the cooperating moveable member to move towards or away from the resilient member.

In a set of embodiments, the resilient biasing mechanism is configured to convert a rotational motion of the support into a linear motion of a translatable member, wherein the linear motion of the translatable member applies a force to the resilient member, thereby applying a or the mechanical stress to the resilient member or increasing a or the mechanical stress applied to the resilient member. The linear motion may be parallel to the third axis. The translatable member may push or pull against the resilient member to compress or extend it, e.g. in a direction parallel to the third axis.

In a set of embodiments, the resilient biasing mechanism comprises a cam and at least one cam follower, wherein the cam and the at least one cam follower are configured to convert the rotational motion of the support into the linear motion of the translatable member.

The cam may be provided with a profiled surface, e.g. the profiled surface may be provided on an end surface of the cam. Such a cam may be referred to as an end cam. The cam follower(s) may be disposed so that they are in contact with the profiled surface. The cam may be connected (directly or indirectly) to the support so that rotation of the support causes the cam to rotate. Rotation of the cam may cause the cam follower(s) to travel over the profiled surface of the cam. The cam may be arranged to move the cam follower(s) towards or away from the resilient member as they travel over the profiled surface during rotation of the cam. Movement of the cam member(s) towards or away from the resilient member may apply a mechanical stress to the resilient member or increase, decrease or remove a mechanical stress applied to the resilient member, e.g. the cam follower(s) may directly or indirectly cause a force to be applied to the resilient member, e.g. the cam follower(s) may be in contact with, braced against and/or attached to the translatable member in various embodiments.

The profiled surface of the cam may have any suitable shape, but in some embodiments, the profiled surface comprises one or more slopes, e.g. linear slopes or wedge-shaped slopes, or curved slopes. The profiled surface may have one or more regions of minimum height (e.g. a local minimum or local minima), which may correspond to a point or region of contact with the cam follower(s) when the support is in the neutral position. The height of the profiled surface may increase (e.g. linearly) in both directions of travel of the cam follower(s) away from the regions(s) of minimum height, i.e. in the directions that the cam follower(s) travel over the profiled surface when the support turns. The rate of change in height is preferably the same in each direction (i.e. so that the profile in each direction is the same, but inverted).

The biasing force applied to the support when the support is in the neutral position may be zero or non-zero. For example, the cam, the cam follower(s) and the resilient member may be configured so that the resilient member is subject to a mechanical stress when the support is in the neutral position (e.g. when the cam follower(s) are positioned at the regions of minimum height). The cam, the cam follower(s) and the resilient member may be configured so that the resilient member is not subject to a mechanical stress when the support is in the neutral position.

The resilient biasing member may apply a biasing force to the support, e.g. indirectly, e.g. via the cam and cam follower(s). The biasing force may vary linearly with angular displacement of the support. The gradient of the biasing force with respect to angular displacement may be the same in both directions of rotation of the support.

In a set of embodiments, the resilient biasing mechanism comprises a housing. The housing may contain one, more than one, or all of: the resilient member; the translatable member; the cam; and the at least one cam follower. The resilient biasing mechanism may thus be conveniently provided in a self-contained unit. This may be advantageous, for example, for installation of the resilient biasing mechanism during manufacture of the vehicle, as well as, for example, being more compact and/or user-friendly.

In a set of embodiments, the support is pivotally connected to the frame by a bearing. The resilient biasing mechanism may be mounted over the bearing. The resilient biasing mechanism may surround the bearing, e.g. the resilient biasing mechanism may have an annular shape. For example, the resilient member may be a coil spring, e.g. which may be advantageous as the coil spring may be positioned in the resilient biasing mechanism such that it surrounds the bearing. The resilient biasing mechanism may be positioned on or in line with the third axis.

As mentioned above, the support may take a variety of forms and shapes rather than being an elongate support member, e.g. of the type commonly known for bicycle wheel forks or as seen in WO 2016/009184 curving around a spherical wheel. In a set of embodiments, the support is shaped to provide a rear sphere cover for the rear ground-engaging sphere. It will be understood that the rear sphere cover may cover a portion of the surface area of the rear ground-engaging sphere, for example functioning or appearing like a mud guard. In some examples the rear sphere cover may cover at least 10%, 20%, 30%, or 40% of the surface area of the rear ground-engaging sphere. In some examples the rear sphere cover may cover up to 40%, 50% or 60% of the surface area of the rear ground-engaging sphere.

In a set of embodiments, the vehicle comprises a front support, wherein the front support is fixedly connected to a front portion of the frame and wherein the front sphere is connected to the front support for rotation about the first axis, wherein the front support is shaped to provide a front sphere cover for the front ground-engaging sphere. It will be understood that the front cover may cover a portion of the surface area of the front ground-engaging sphere. It will be understood that the front sphere cover may cover a portion of the surface area of the front ground-engaging sphere, for example functioning or appearing like a mud guard. In some examples the front sphere cover may cover at least 10%, 20%, 30%, or 40% of the surface area of the front ground-engaging sphere. In some examples the front sphere cover may cover up to 40%, 50% or 60% of the surface area of the front ground-engaging sphere.

The front sphere cover and/or the rear sphere cover may have any suitable shape or shapes. For example, the front sphere cover and/or the rear sphere cover may have or comprise a polyhedral shape or an ellipsoidal shape. In a set of embodiments, the front sphere cover and/or the rear sphere cover is formed from or comprises a portion of a spherical shell, e.g. a wedge of a spherical shell, e.g. with a wedge angle between 90° and 180°, e.g. a wedge angle of about 120°, or a wedge angle up to 180° (i.e. a hemisphere). In at least some embodiments, the frame may connect the front sphere cover and the rear sphere cover together.

Providing the support and/or front support with a shape to provide a cover may be advantageous in that a cover may be provided for one or both ground-engaging spheres without a need to provide separate parts for separate support(s) and cover(s). This may improve ease of manufacture and/or save on manufacturing material costs. The Applicant has realized that when the support and/or front support is shaped to provide a cover, a separate housing becomes redundant.

This is considered novel and inventive in its own right and thus, when viewed from a second aspect, the invention provides a vehicle comprising: a frame; a front ground-engaging sphere rotatably mounted on a first axle; a rear ground-engaging sphere rotatably mounted on a second axle; a front support, wherein the front support has a shape comprising a spherical shell portion defining a front cover for the front ground-engaging sphere, wherein the first axle is directly mounted to the front cover, and wherein the front support is fixedly connected to a front portion of the frame; a rear support, wherein the rear support has a shape comprising a spherical shell portion defining a rear cover for the rear ground-engaging sphere, wherein the second axle is directly mounted to the rear cover, and wherein the rear support is connected to a rear portion of the frame; and gripping portions connected to a front portion of the vehicle, for a rider to hold.

This aspect of the invention extends to a vehicle comprising: a frame; a front ground-engaging sphere rotatably mounted on a first axle; a rear ground-engaging sphere rotatably mounted on a second axle; a front support, wherein the front support has a shape comprising a spherical shell portion defining a front cover for the front ground-engaging sphere, wherein the first axle is directly mounted to the front cover, and wherein the front support is fixedly connected to a front portion of the frame; a rear support, wherein the rear support has a shape comprising a spherical shell portion defining a rear cover for the rear ground-engaging sphere, wherein the second axle is directly mounted to the rear cover, and wherein the rear support is pivotally connected to a rear portion of the frame; and gripping portions connected to a front portion of the vehicle, for a rider to hold.

According to this aspect of the invention, the first and second axles are mounted directly to the front and rear covers, respectively. The front and rear covers therefore function to both support and house the ground-engaging spheres. This can reduce the part count and material cost, as well as making assembly of the vehicle quicker and easier.

In embodiments of the second aspect, preferably the front sphere is rotatable about a first axis which is transverse and fixed relative to the frame. Preferably the rear sphere is rotatable about a plurality of axes. Preferably the rear sphere is connected to the rear support for rotation about a second axis which is transverse and fixed relative to the rear support. The rear support may be fixedly connected to the rear portion of the frame. Preferably the rear support is pivotal with respect to the frame about a third axis which extends downwardly and longitudinally of the vehicle. Preferably the rear support is pivotable through a range of positions, said range of positions including a neutral position wherein the first and second axes are parallel. Such a vehicle may therefore help a rider to learn how to steer by encouraging a sense of balance as described hereinabove.

In at least some embodiments, the vehicle further comprises a resilient biasing mechanism configured to resiliently bias the rear support towards the neutral position. Optional features of the first aspect of the invention, as described above, may also be features of the second aspect of the invention, where applicable.

There will now be described some general features that are applicable to embodiments of the first and second aspects of the invention.

In some embodiments the third axis passes through the rear sphere, preferably through the center of the rear sphere or adjacent to (i.e. close to) the center of the rear sphere. Preferably the combination of the rear sphere and the support does not operate as a conventional castor, and the third axis should not lie too far from the center of the rear sphere. Preferably a feature of some embodiments is that the outer surface of the sphere does not change position, i.e. there is not the wiggle that there is with a castor as it revolves around its axis. However, it may be that a little deviation of the third axis from the center of the sphere makes an improvement in performance.

Generally speaking, a sphere is a specific geometric object, but in the context of the present invention in practical embodiments a perfect sphere may not be used. For example the "sphere" may be a body that has a spherical contact surface but for example the ends may be truncated where the ends of the axles are and there may be further truncation as desired. It may also be that moving slightly away from a true spherical contact may help with self-centering. Thus in the context of the present invention, the expression "sphere" means a body having a substantially or approximately spherical ground-engaging contact surface, regardless of the shape of the remainder of the body. Similarly, in embodiments wherein the support and/or front support are shaped to provide a sphere cover, the cover(s) may not necessarily be portions of perfect spheres. For example, the covers may deviate from a sphere shape in the region surrounding the mounting points of the axles, e.g. those regions may be flatter.

The angle of the third axis to a vertical line passing through the point of connection of the support to the frame could be any acute angle (i.e. any angle such that the axis extends downwardly). In a set of embodiments, the third axis extends downwardly at an angle between about 30° to 60° to a vertical line passing through the point of connection of the support to the frame, preferably between about 35° to 55°, e.g. about 40° to 50°, e.g. about 45°.

The rear ground-engaging sphere could be freely rotatable about the third axis, but in a set of embodiments, the rear ground-engaging sphere is rotatable about the third axis by a limited angle. The limited angle may be no more than about 90°, (i.e. a total range of rotational movement of no more than about 1800), more preferably between about 60° and 90° (i.e. a total range of about 120° to 180°), and most preferably about 85° (i.e. a total range of about 170°). This could be achieved by having stops that restrain the rotation of the support member. The resilient biasing mechanism may comprise stops which limit the angle of rotation of the rear ground-engaging sphere. For example, the profiled surface may be shaped to limit the travel of the cam follower(s) in various embodiments, e.g. by providing a region of the profiled surface that extends in a direction substantially parallel to the rotational axis of the cam, such that the cam follower(s) cannot travel beyond that region.

In a set of embodiments, the vehicle comprises a seat for a rider positioned so that a rider sitting on the seat can propel the vehicle by the rider's feet engaging the ground. This could be provided between the front and rear spheres, or at least partially over the rear sphere. In some examples the vehicle takes the form of a foot-propelled bicycle. However, the vehicle may instead comprise a foot board for a rider to stand on while propelling the vehicle using one foot. This could be provided between the front and rear spheres, or at least partially over the rear sphere. In some examples the vehicle takes the form of a powered or unpowered scooter.

In preferred embodiments the vehicle comprises a seat so that a rider can propel the vehicle using both feet. Preferably the seat is connected to or mounted on the frame. In some embodiments, the position of the seat relative to the frame is adjustable. For example, seat may be removably or releasably attached to the frame. The frame may have multiple attachment points or a continuous range of attachment points to which the seat is attachable, where the points correspond to different seat positions.

An adjustable seat position may advantageously allow the vehicle to be adjusted for different riders (e.g. having different heights) or to be adjusted to adapt the vehicle to a rider's change in height as they grow older. This feature may be particularly advantageous in combination with the feature of the resilient biasing mechanism being adjustable, as described above, which may also allow the vehicle to be adapted for different rider heights and/or levels of riding experience. However, these features need not necessarily be provided together in combination and some embodiments may have only one of them.

The gripping portions may be connected directly to the frame. In some embodiments of the invention, the gripping portions are fixed relative to the frame. By this is meant that the gripping portions are not moveable relative to the frame to effect steering of the vehicle. As the first axis is also fixed relative to the frame, the gripping portions cannot be moved to steer the front ground-engaging sphere. The gripping portions could be separate portions of a single member such as a handle bar extending across the vehicle, or could be completely separate members. However, a certain degree of movement could be permitted, which whilst not per se steering the vehicle, could introduce the rider to the sensation of movement of a steering system whilst moving.

As is conventional for many types of bicycle, it is preferable that the gripping portions are arranged on a transverse axis relative to the frame. In one or more embodiments, the vehicle comprises a transverse handle bar or a pair of transverse handle bars, and each of the gripping portions is arranged on the transverse handle bar(s). The transverse handle bar(s) is/are preferably fixed relative to the frame. In at least some embodiments, the frame includes the transverse handle bar(s) as part of a unitary construction. For example, the frame and the transverse handle bar(s) may be formed from the same set of one or more metallic (e.g. aluminum) tubes. In another example, the frame and the transverse handle bar(s) may be formed from the same piece of wooden or plastic material.

It will be appreciated that references to vertical, downwards and forwards are references to when the vehicle is in use with both spheres lying on a horizontal surface, and that references to vertical or horizontal are not meant to imply a strict geometrical orientation but include some angular deviations from either.

The invention extends to a resilient biasing mechanism suitable for use as the resilient biasing mechanism of a vehicle as defined above. Such a resilient biasing mechanism may have any or all of the features described above, where applicable.

An arrangement comprising a resilient biasing arrangement and a bearing for pivotally mounting a support as described herein is novel and inventive in its own right, and thus when viewed from a third aspect, the invention provides a resilient biasing arrangement suitable for pivotally mounting a support therein, the support comprising a connecting member for mounting a spherical wheel, the resilient biasing arrangement comprising: a resilient biasing mechanism; and a bearing for receiving the connecting member of a support in use; wherein the bearing facilitates pivotal movement of the support in use about a rotational axis of the support through a range of angular positions including a first position; and wherein the resilient biasing mechanism is configured to bias the support towards the first position when the support is mounted in the bearing in use.

The resilient biasing arrangement of the third aspect is preferably suitable for use as the resilient biasing mechanism of a vehicle as described above in relation to the first and second aspects. Optional features of the first and/or second aspects of the invention may also be features of the third aspect of the invention, where applicable. The first position may correspond to a neutral position, as defined above.

In some embodiments in accordance with the first and second aspects, the frame may comprise an upwardly projecting region with the gripping portions provided on said upwardly projecting portion. This may make gripping portions easier for the rider to reach. Upwardly projecting in this context means extending in a direction having at least some vertical extent when the vehicle is in an upright position, e.g. projecting in a direction at an angle that is less than 45 degrees to a vertical line passing through the center of the front sphere.

However, the Applicant has appreciated that providing the gripping portions in a position that is more difficult for a rider to reach can be beneficial, in particular for a young child learning to ride the vehicle. In a set of preferred embodiments, the vehicle is provided with a seat, and the gripping portions are provided in a position such that, in use, a rider sitting on the seat cannot reach the gripping portions without leaning forward. The seat may have any of the optional features discussed above in relation to the first aspect of the invention.

This is considered novel and inventive in its own right and thus, when viewed from a fourth aspect, the invention provides a vehicle comprising: a frame; a front ground-engaging sphere rotatably mounted on a first axle; a rear ground-engaging sphere rotatably mounted on a second axle; a seat for a rider positioned so that a rider sitting on the seat can propel the vehicle by the rider's feet engaging the ground; and gripping portions connected to a front portion of the vehicle, for a rider to hold, wherein the gripping portions are provided in a position such that, in use, a rider sitting on the seat cannot reach the gripping portions without leaning forward.

Optional features of the first, second and/or third aspects of the invention may also be features of the fourth aspect of the invention, where applicable. The vehicle is preferably a bicycle. The vehicle is preferably a ride-on foot-propelled vehicle. Preferably the vehicle is does not have pedals. A bicycle without pedals is commonly known in the art as a "balance bike". As discussed above, this type of bicycle can propelled by a person sitting on the vehicle with the person's feet engaging the ground, instead of being propelled by pedals. Thus, although some examples of the vehicles described herein are referred to as "bicycles", the skilled person will appreciate that "bicycles" includes "balance bikes" and does not necessarily require the vehicles to have pedals or to be propelled by cycling.

The person skilled in the art knows that a ride-on vehicle such as a bicycle would, in normal use, be selected to fit the height of the child. The skilled person will also understand that where an adjustable seat is provided, the vehicle would also in normal use have the position of the seat selected to fit the height of the child. Thus when a child is seated on the vehicle in normal use, the height of the seat from the ground determines the reach of the child's arms when seated in an upright position, according to the typical body proportions of a child.

The gripping portions may be too low for the child to reach when sitting upright on the seat. The gripping portions may be too far forward for the child to reach when sitting upright on the seat. The gripping portions may be both too far forward and too low for the child to reach when sitting upright on the seat.

The gripping portions may be positioned such that, when the vehicle is positioned upright on a flat surface, the height of the gripping portions above the flat surface is less than 140% (e.g. less than 130%, e.g. less than 120%) of the height of the seat above the flat surface. In addition, or alternatively, the gripping portions may be positioned such that, when the vehicle is positioned upright on a flat surface, the height of the gripping portions above the flat surface is at least the same height as the height of the seat above the flat surface. Where the seat is adjustable, the height of the seat may refer to when the seat adjusted to the lowest possible position. The height of the seat may refer to the lowest part of the seat, i.e. the part of the seat that the rider sits on.

The gripping portions may be positioned such that they are forward of the first axle (where forward means farther in a direction extending longitudinally of the vehicle from the center of the rear sphere to the center of the front sphere). The frame may comprise a front frame portion shaped to follow a contour of the front sphere and the gripping portions may be provided directly on said shaped front frame portion without being provided on an intermediate upwardly projecting portion of the frame.

The frame may extend from a or the front support to a or the rear support (where the front and rear supports have the front and rear spheres respectively mounted therein) such that the frame connects the front and rear supports. The seat may be connected to the frame, e.g. directly mounted thereon. The gripping portions may be connected directly to the frame. Alternatively, the gripping portions may be connected directly to the front support, e.g. to a or the spherical shell portion of the front support.

In accordance with all aspects, the gripping portions preferably have an elongate (e.g. cylindrical or tubular shape). The gripping portions preferably extend out from a point of connection to the vehicle (e.g. to the frame) in a direction transverse to the longitudinal axis of the vehicle. The gripping portions preferably extend in a substantially horizontal direction.

The Applicant has found that providing the gripping portions in a position that compels the rider to lean forward to reach the gripping portions when sitting on the seat has unexpected advantages in helping a young rider to learn to use the vehicle. The vehicle may be sized to fit a young rider, e.g. the vehicle may be sized to fit a child having a height of less than 1.1 meters, e.g. less than 1 meter, e.g. less than 0.9 meters, e.g. less than 0.8 meters. The height of the seat (or the lowest height, where the seat is adjustable) may be less than 0.6 meters, e.g. less than 0.55 meters, e.g. less than 0.5 meters, e.g. less than 0.45 meters, e.g. less than 0.4 meters.

The advantage for helping a young rider to learn to ride is that when the rider sits on the vehicle, they are compelled to lean forward to reach the gripping portions, instead of adopting an upright position that may feel more natural to them. This forward-leaning body position is helpful for the rider because it is more stable. It also makes it easier for the rider to push their feet backwards to propel the bike forwards. The child thus learns to ride the vehicle more quickly, and thus more quickly learns the motor skills need to ride the vehicle, e.g. the ability to correct and maintain their balance as they propel themselves forward.

The Applicant has appreciated a further advantage of this position of the gripping portions, which is that it may prevent a child reaching the gripping portions while in a standing position over the seat, e.g. the child when standing may be unable to lean forward to reach the gripping portions without losing their balance. This compels the child to sit down on the seat in order to reach the gripping portions. Young children who have not yet learned to ride a vehicle such as a bicycle may try to use the vehicle incorrectly, e.g. holding the gripping portions while standing, lifting the front sphere off the ground and walking with the vehicle between their legs. Providing the gripping portions in a position that compels the child to sit on the vehicle to reach the gripping portions may help to prevent this behavior. Instead, it may encourage the child to adopt a seated position more quickly when they are first learning to ride the vehicle, which may help them to learn the motor skills associated with riding the vehicle more quickly. Thus in a set of embodiments, the vehicle is provided with a seat and the gripping portions are provided in a position such that, in use, a rider of the vehicle cannot reach the gripping portions while in a standing position over the seat.

BRIEF DESCRIPTION OF THE DRAWINGS

Certain preferred embodiments will now be described, by way of example only, with reference to the accompanying drawings, in which.

DETAILED DESCRIPTION

Figure 1A:
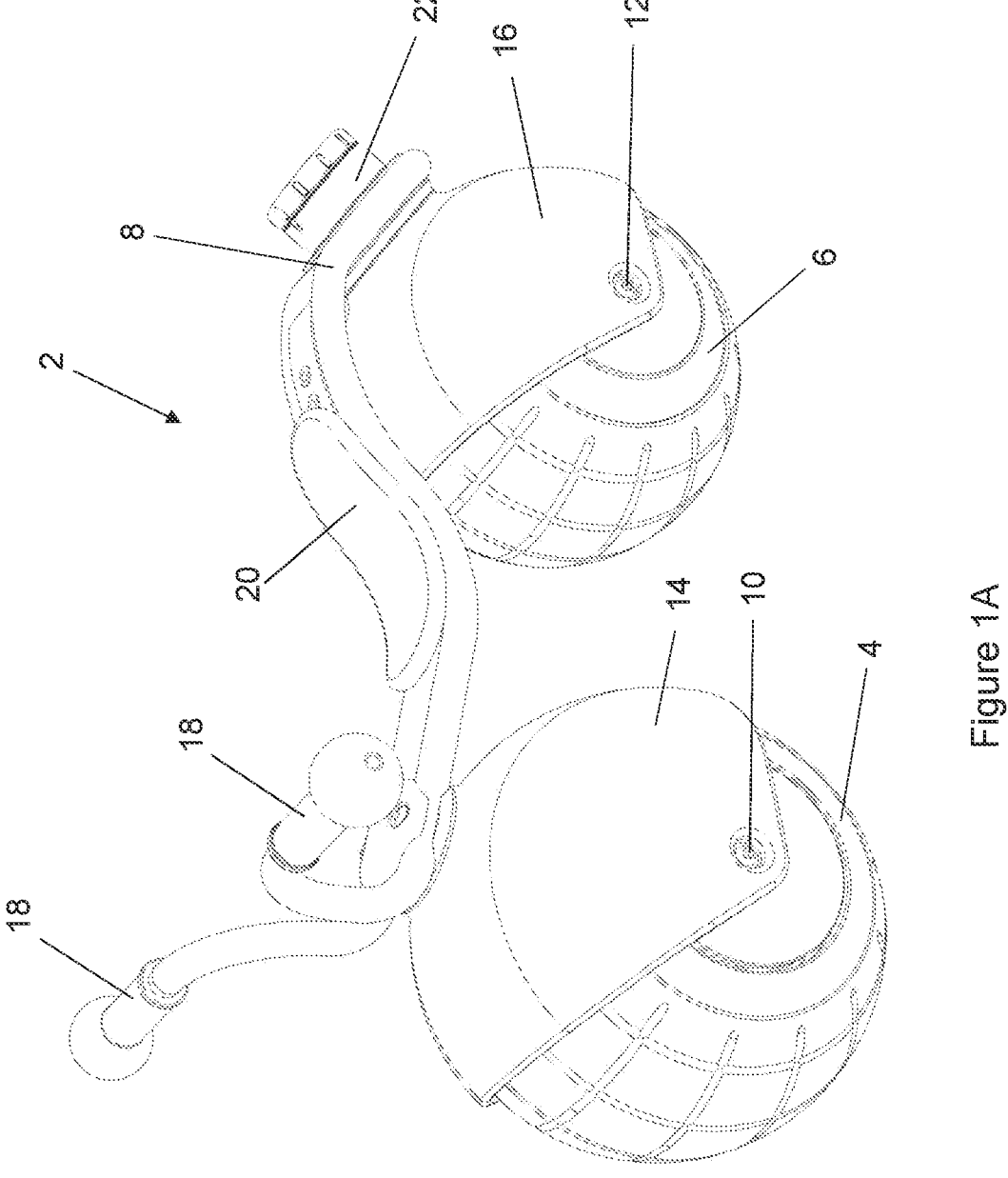
FIG. 1A shows a perspective view of a bicycle having an adjustable resilient biasing mechanism in accordance with an embodiment of the present invention.
Figures 1B, 1C:
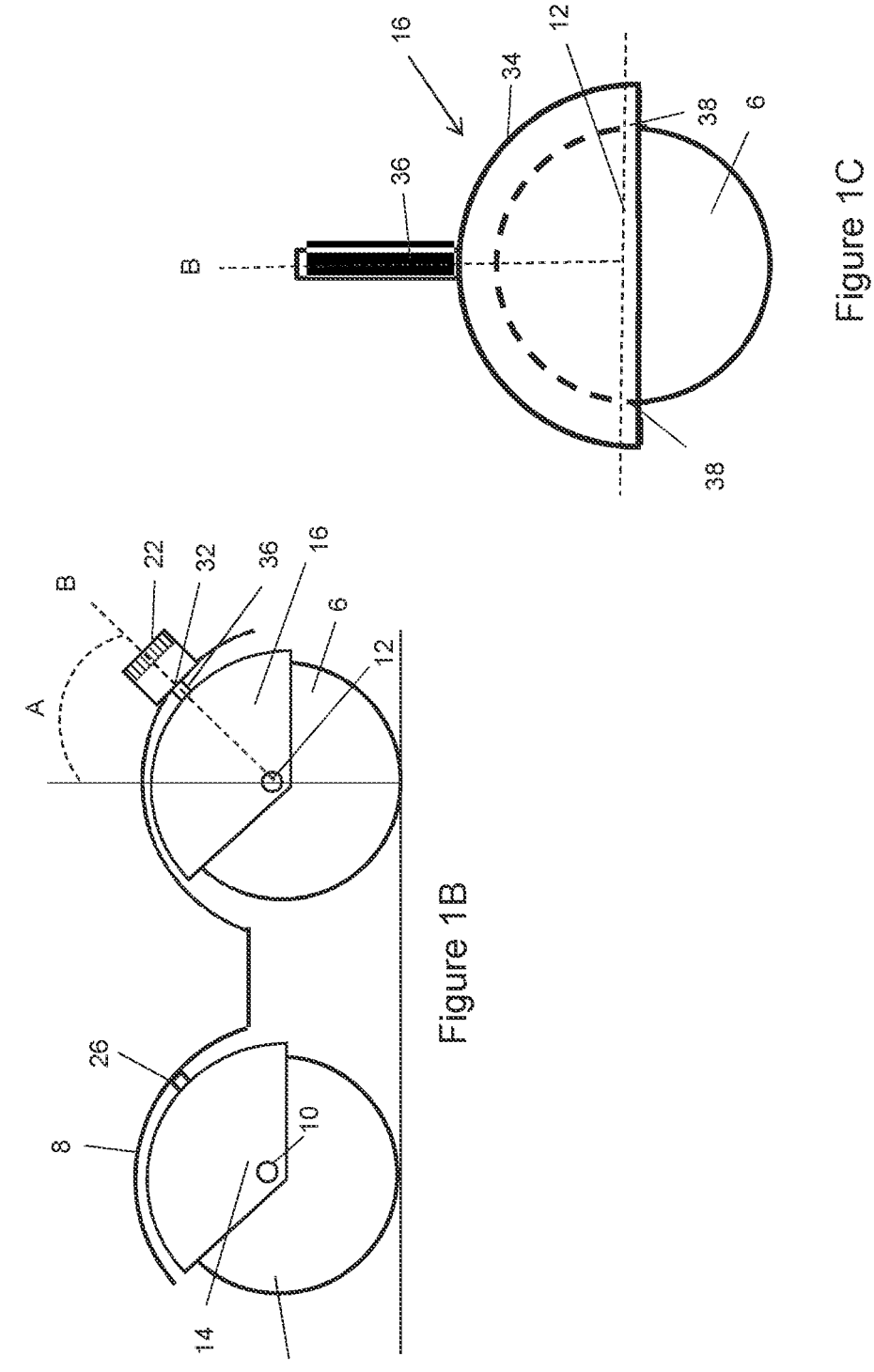
FIG. 1B shows a schematic side view of the bicycle of FIG. 1A.
FIG. 1C shows the rear sphere and support of the bicycle of FIG. 1A.

FIGS. 1A-1C show an embodiment of a bicycle with a resilient biasing mechanism in accordance with the invention. The bicycle 2 comprises a front ground-engaging sphere 4 and a back ground-engaging sphere 6 mounted on a frame 8. Front and rear spheres 4, 6 are provided with respective axles 10, 12 defining first and second axes about which the spheres rotate. The axles 10, 12 therefore define first and second axes which are transverse and fixed. The spheres 4, 6 are mounted in respective front and rear supports 14, 16, which comprise portions that are shaped as wedges of a spherical shell so as to define a cover for the spheres 4, 6 and have the appearance of a mudguard. The front and rear axles 10, 12 are directly mounted to the front and rear supports 14, 16. The frame 8 is provided with gripping portions in the form of handles 18 for a rider to grip while riding the bicycle 2, and a saddle-type seat 20 for the rider to sit on. The seat 20 is adjustable between different positions to allow the seat position to be changed to suit the rider, e.g. to adjust for height or age of the rider.

The rear support 16 is pivotally mounted to the frame (as described below with reference to FIGS. 1B and 1C) such that the rear sphere 6 can turn to allow the bicycle 2 to turn as it is propelled by the rider. The bicycle 2 is provided with an adjustable resilient biasing mechanism 22, which provides a force urging the rear sphere 6 back to a neutral position whenever it is turned. The adjustable resilient biasing mechanism 22 is described in detail below with reference to FIGS. 2 to 4. Although the examples shown and described have an adjustable resilient biasing mechanism, it is not essential for the resilient biasing mechanism to be adjustable. In variants and other embodiments, a non-adjustable resilient biasing mechanism may be provided. In some variants and other embodiments, the vehicle may be provided without a return spring mechanism, e.g. in embodiments in which the rear support is fixedly attached to the frame.

FIG. 1B shows a schematic side view of the bicycle 2 of FIG. 1A. As mentioned above, the front sphere 4 is mounted on the frame 8 by means of a front support 14. The front support 14 is fixedly attached to the frame 8 at a point of connection 26, and broadly speaking extends forwardly and downwardly from the point of connection 26 to a point of connection to the axle 10, on which the front sphere 4 is mounted. The axle 10 is transverse and directly fixed to the front support 14, the front sphere 4 being freely rotatable about the first axis of the axle 10.

As mentioned above, the rear sphere 6 is connected to the frame 8 by a rear support 16. The rear support 16 is connected to the frame 8 at a connection point 32 by means of a bearing (not seen) contained in the resilient biasing mechanism 22 so that the rear support 16 is pivotal with respect to the frame 8. The rear support 16 is oriented such that a line joining the connection point 32 to the center of the axle 12 is at an angle A to a vertical line through the center of the rear sphere 6. This line joining the connection point 32 to the center of the axle 12 coincides with a third axis about which the rear support 16 is pivotal with respect to the frame 8, as is described further below. In the present embodiment, the angle A is 45°, although it will be appreciated that other angles are possible. The details of the mounting of the rear sphere 6 via the rear support 16 is described in greater detail with reference to FIG. 1C.

FIG. 1C shows the rear sphere 6 of the bicycle 2 mounted on the rear support 16. The rear support 16 is connected to the rear wheel's axle 12, and comprises an axle mount 34, which has the shape of a spherical shell wedge, and a connecting portion 36, which is perpendicular to the axle 12 and which is received in the bearing in the resilient biasing mechanism 22. The connecting portion 36 therefore defines the third axis B about which the rear support 16 can pivot with respect to the frame 8. The rear sphere 6 is freely rotatable about the second axis of the axle 12. The axle 12 is mounted in bearings 38 at each end of the axle mount 34.

As explained above with reference to FIG. 1B, the rear support 16 is positioned to define an acute angle A with a vertical line passing through the rear sphere 6. The rear support 16 thus extends forwardly and downwardly with respect to the connection point 32 and the third axis B, about which the rear support 16 rotates, extends forwardly and downwardly of the bicycle 2. This configuration provides the behavior of the vehicle in response to a rider propelling it forward while leaning to turn left or right, or during a loss of balance, as described above.

Figure 2A:
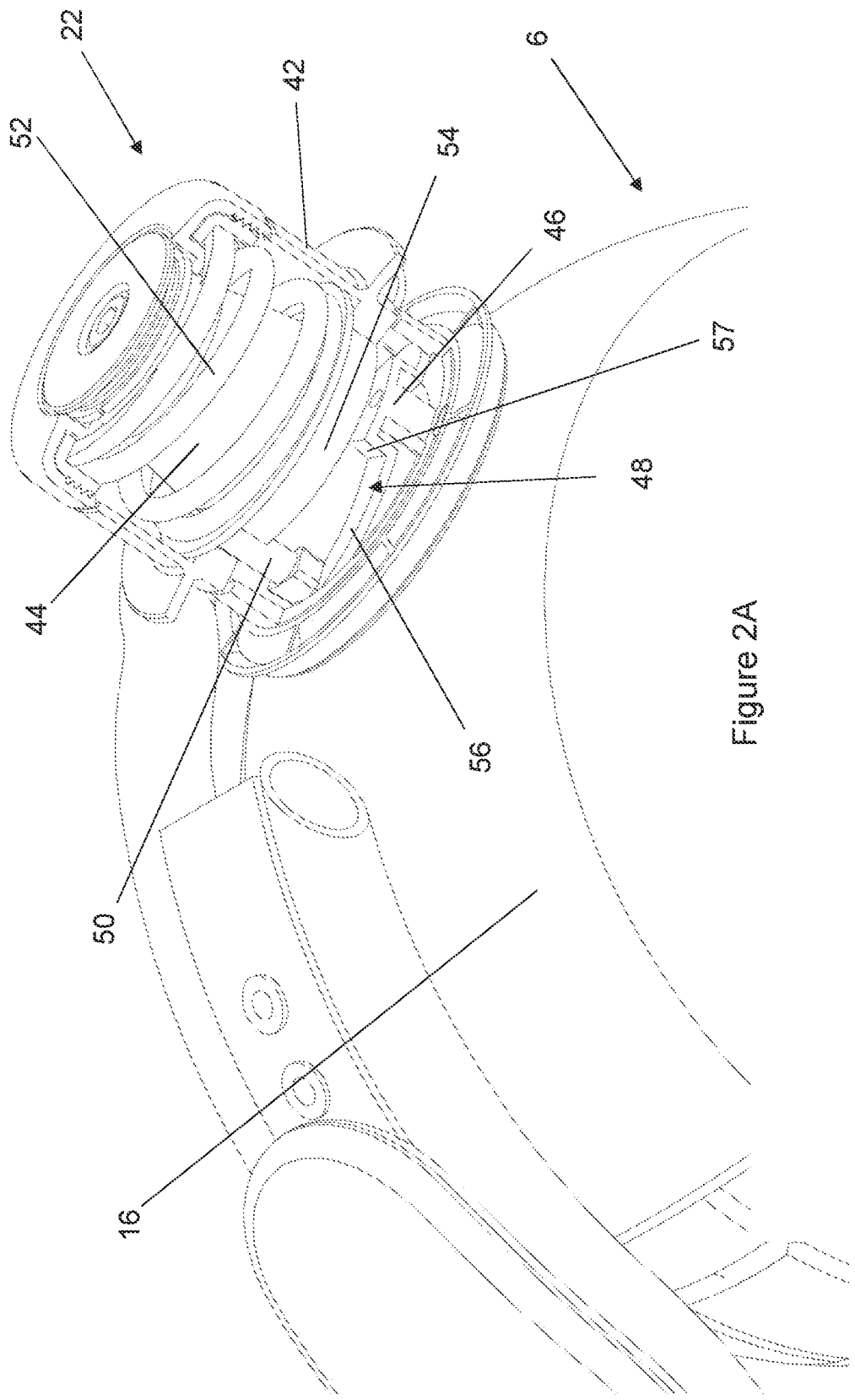
FIG. 2A shows a close-up interior view of the adjustable resilient biasing mechanism shown in FIG. 1 with the rear sphere in a neutral position.
Figure 2B:
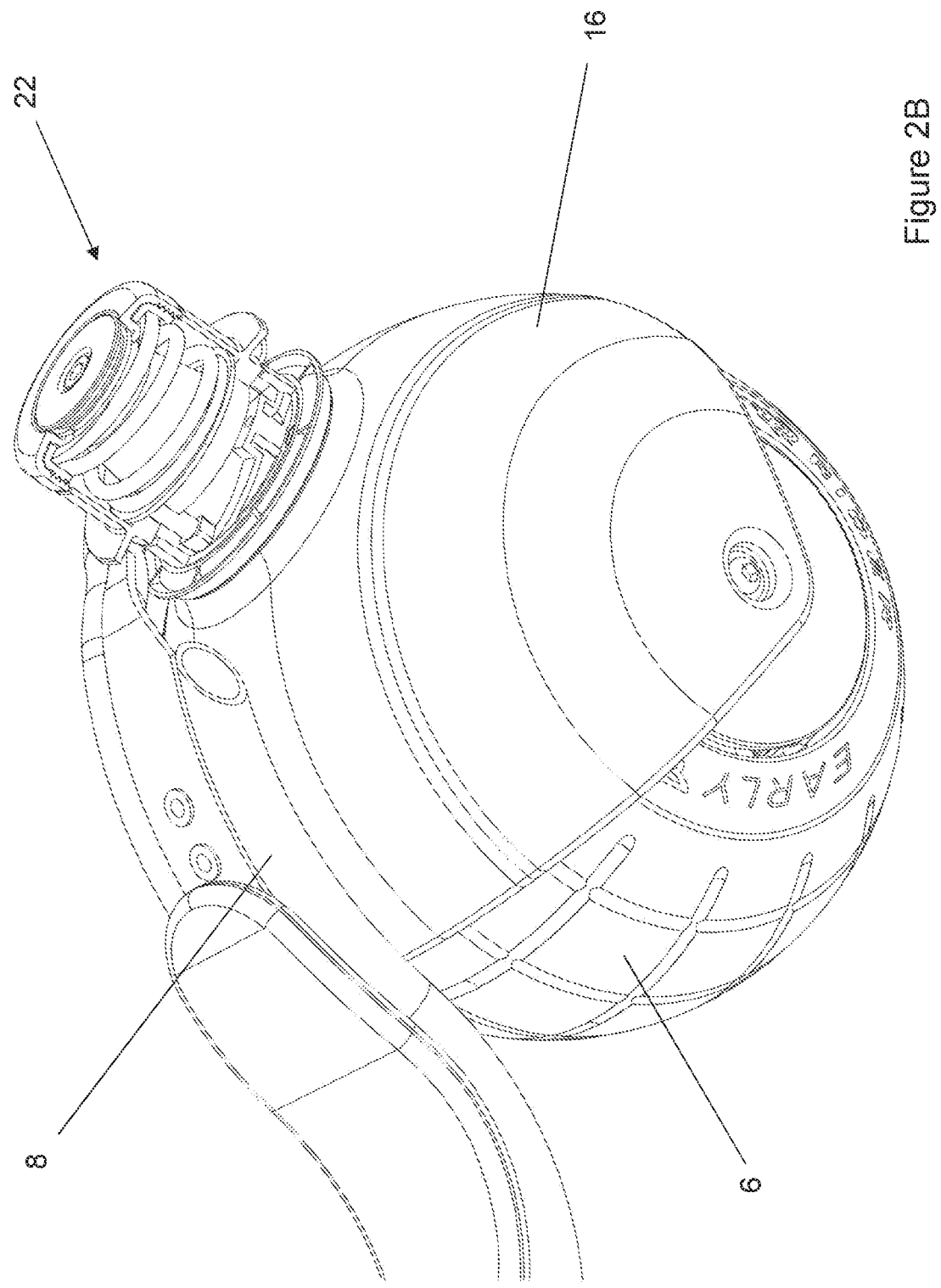
FIG. 2B shows a wider view of the adjustable resilient biasing mechanism shown in FIG. 2A.

FIG. 2A shows a close-up view of the adjustable resilient biasing mechanism 22 of the bicycle 2. FIG. 2B shows a slightly wider view of the adjustable resilient biasing mechanism 22 shown in FIG. 2A, showing more clearly the orientation of the rear sphere 6.

The resilient biasing mechanism 22 is mounted around a central bearing 44 which receives the connecting portion 36 (not visible in FIG. 2) of the rear support 16, so that the rear support 16 and thus the rear sphere 6 are pivotally mounted relative to the frame 8.

The resilient biasing mechanism 22 comprises a cam 46 having a profiled end surface 48, a number of cam followers 50, and a resilient member in the form of a spring 52. The cam followers 50 are connected to an annular member 54 that is braced against the spring 52 such that the spring 52 exerts a biasing force, pushing the cam followers 50 against the profiled end surface 48 of the cam 46. In FIG. 2A, only one cam follower 50 is visible, but in the present embodiment a second cam follower is provided on the other side of the resilient biasing mechanism, i.e. in a position diametrically opposed to the cam follower 50 that is visible. However, the resilient biasing mechanism 22 could have a different number of cam followers, e.g. one, two, three, four or more than four.

The cam 46 is connected to the rear support 16 such that the cam 46 rotates together with the rear support 16 when the rear support 16 rotates in the bearing 44. The profiled surface 48 of the cam 46 comprises a respective wedged-shaped sloped surface 56 corresponding to each cam follower 50. When the rear sphere 6 is in a neutral position (i.e. it is not turned but instead faces forward, as shown in FIG. 2A, so that the bicycle travels straight ahead when propelled by the rider), the cam followers 50 are positioned at the bottom of each sloped surface 56.

Figure 3A:
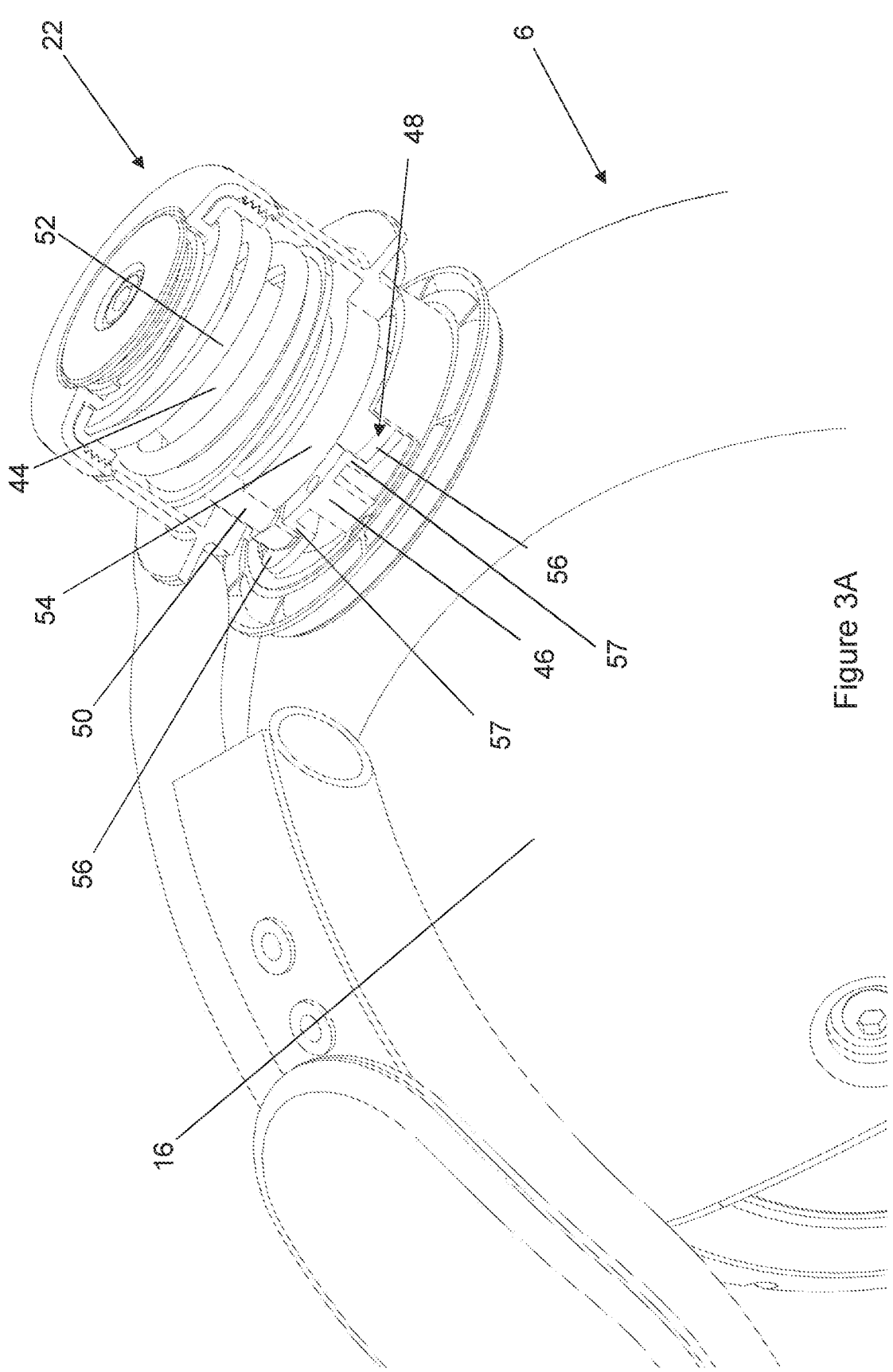
FIG. 3A shows a close-up interior view of the adjustable resilient biasing mechanism as shown in FIG. 2A with the rear sphere in a turned position.
Figure 3B:
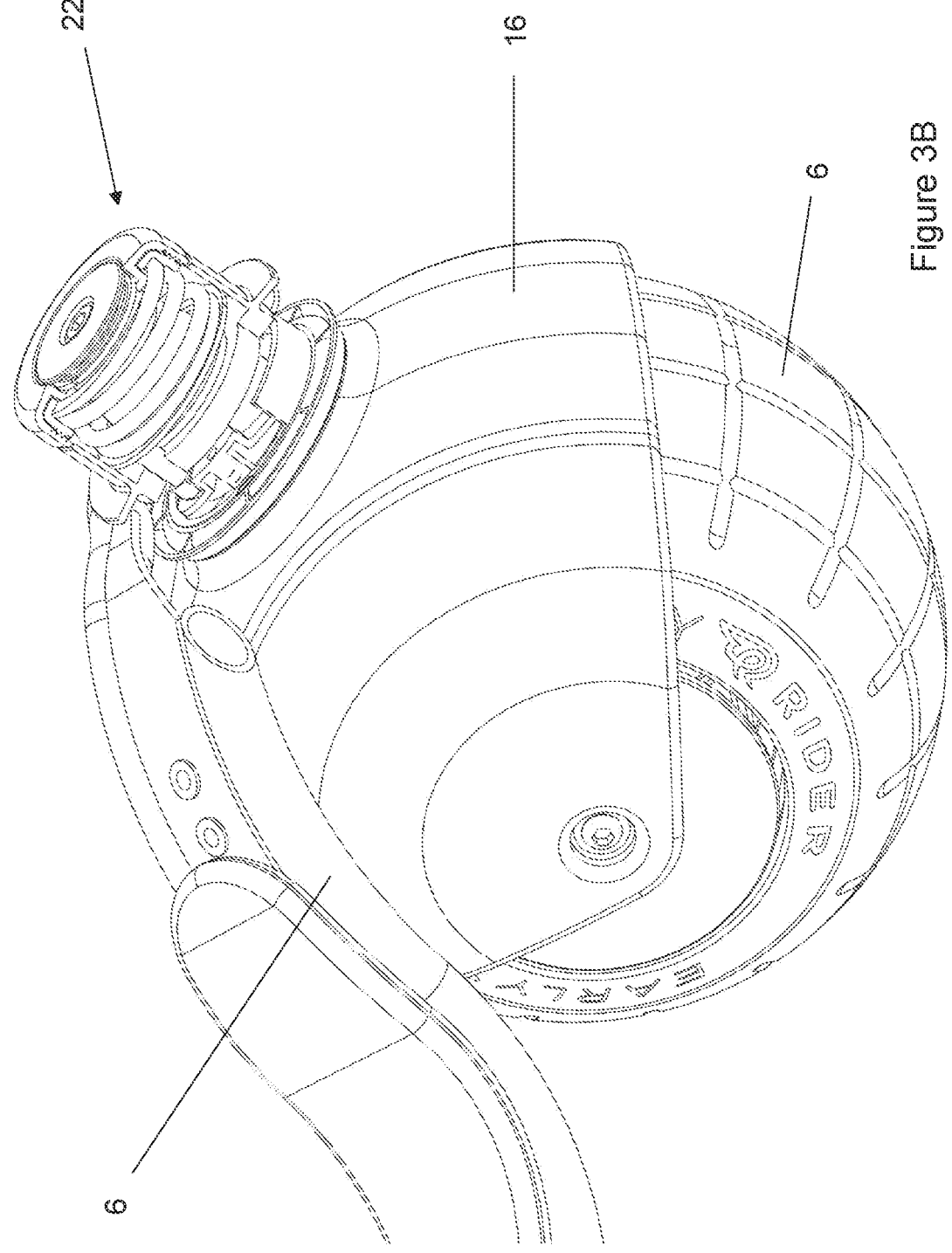
FIG. 3B shows a wider view of the adjustable resilient biasing mechanism shown in FIG. 3A.

FIG. 3A depicts the action of the resilient biasing mechanism 22 when the rear sphere 6 is turned. FIG. 3B shows a slightly wider view of the adjustable resilient biasing mechanism 22 shown in FIG. 3A, showing more clearly the orientation of the rear sphere 6.

When the rear sphere 6 turns, thus turning the rear support 16, the cam 46 rotates, driving the sloped surfaces 56 under the cam followers 50 so that the cam followers 50 travel up the sloped surfaces 56. The cam followers 50 and annular member 54 are thus pushed towards the spring 52, which exerts a reaction force back against the annular member 54 and the attached cam followers 50. This reaction force urges the cam followers 50 to travel back down the sloped surfaces 56, which in turns urges the profiled surface 48 of the cam 46 (and thus the rear support 16 and rear sphere 6) back to the neutral position depicted in FIG. 2A. The resilient biasing mechanism 22 thus provides a return force biasing the rear sphere 6 towards a neutral position.

The profiled surface 48 of the cam 46 is provided with vertical regions 57, which provide stops preventing the cam followers 50 traveling any further over the profiled surface 48 once they reach the vertical regions 57. The cam 46 (and therefore the rear support 16) is thereby prevented from rotating beyond the angle at which the cam followers 50 reach the vertical regions 57. In the present embodiment, this limiting angle is 85°, so that the rear support 16 can be rotated by up to 85° in either direction. However, other angles are possible in other embodiments and in variations on this embodiment.

Figure 4:
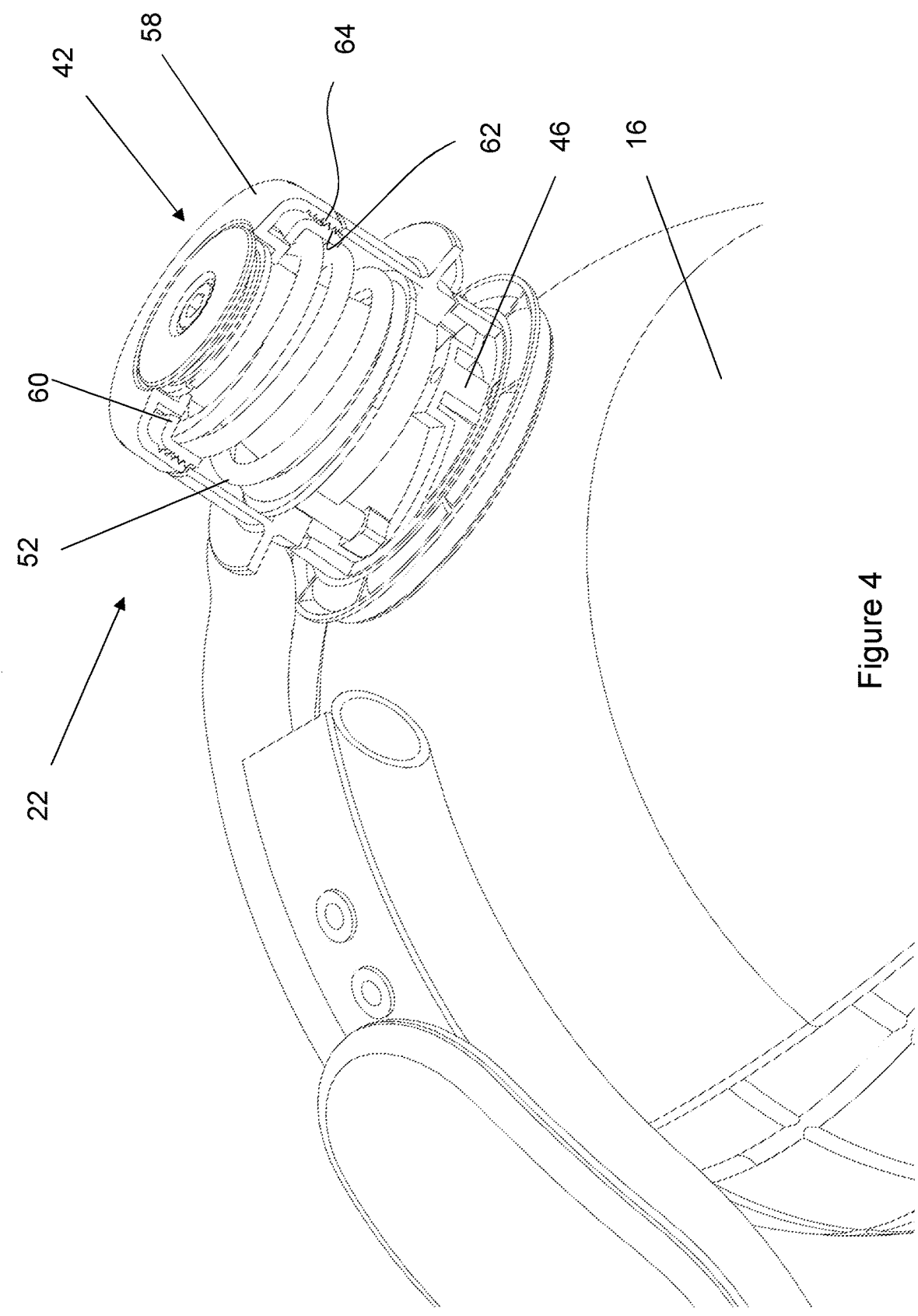
FIG. 4 shows a close-up interior view of the adjustable resilient biasing mechanism of FIG. 1, adjusted to a position that provides an increased return force on the support and rear sphere.

FIG. 4 shows the adjustable resilient biasing mechanism 22 of FIGS. 2 and 3 when it is adjusted to a position wherein an increased biasing force is applied to the rear support 16, urging it towards the neutral position, i.e. such that more force is required to turn the sphere 6 and such that the sphere 6 is returned to the neutral position with greater force.

The resilient biasing mechanism 22 of the present embodiment is provided with a twistable lid 58, which forms part of the housing 42 of the resilient biasing mechanism. The twistable lid 58 adjusts the resilient biasing mechanism to change the magnitude of the return spring force applied to the rear sphere 6 when it turns. In variants and embodiments without an adjustable resilient biasing mechanism, a fixed lid may be provided instead of a twistable lid. The fixed lid may have the same or a similar appearance to the twistable lid.

As can be seen from FIG. 4, inside the housing 42, the spring 52 is provided with an annular cap 60 positioned between the end of the spring 52 and the twistable lid 58. The annular cap 60 has an external thread 62 that engages with an internal thread 64 of the twistable lid 58. When the lid 58 is twisted, the engagement with the thread of the annular cap 60 causes the annular cap 60 to move either toward or away from the cam 46, depending on whether the twistable lid 58 is twisted clockwise or anticlockwise. The annular cap 60 presses against the end of the spring 52 that is farthest from the cam 46, so that movement of the annular cap 60 towards the cam 46 increases the compression of the spring 52, and movement of the annular cap 60 away from the cam 46 decreases the compression of the spring 52.

The greater the compression of the spring 52, the greater the force applied by the spring 52 to the annular member 54 and to the cam followers 50 attached thereto (as seen in FIG. 3A). Thus, when the twistable lid 58 is twisted so as to bring the annular cap 60 closer to the cam 46 (which may be referred to as "tightening" the resilient biasing mechanism 22), the spring 52 exerts a greater force biasing the rear sphere 6 to the neutral position. Accordingly, when the resilient biasing mechanism 22 is tightened, more force is required to turn the rear sphere 6, and when it is turned, there is a greater force urging it back to the neutral position.

Conversely, when the twistable lid 58 is twisted so as to bring the annular cap 60 farther away from the cam 46 (which may be referred to as "loosening" the resilient biasing mechanism 22), the spring 52 exerts a smaller force biasing the rear sphere 6 to the neutral position. Accordingly, when the resilient biasing mechanism 22 is loosened, less force is required to turn the rear sphere 6, and when it is turned, there is a smaller force urging it back to the neutral position.

This adjustment of the resilient biasing mechanism, as described above, changes the magnitude of the biasing force applied to the rear support 16 towards the neutral position. More specifically, tightening and loosening the resilient biasing mechanism 22 changes the rate at which the magnitude of the biasing force increases with angular displacement of the rear support 16 as the rear support 16 rotates about the third axis B. This can be understood by considering the effect of using the twistable lid 58 to introduce a compression to the spring 52 when the rear support 16 is in the neutral position. Generally, when the spring 52 is slightly compressed due to rotation of the rear support 16, it will exert a small reaction force biasing the rear support 16 back to the neutral position. When the rear support 16 is rotated further, the spring 52 is further compressed and the reaction force becomes greater. When the resilient biasing mechanism 22 is tightened by the twistable lid 58, the spring 52 is already partly compressed even in the neutral position. Therefore, as the rear support 16 turns and compresses the spring 52 further, the magnitude of the reaction force will increase more rapidly as the rear support 16 turns, producing a greater biasing force for a given rotation of the rear support 16 compared with when the spring 52 is not already compressed or when it is compressed less (i.e. when the resilient biasing mechanism 22 is loosened).

Figure 5:
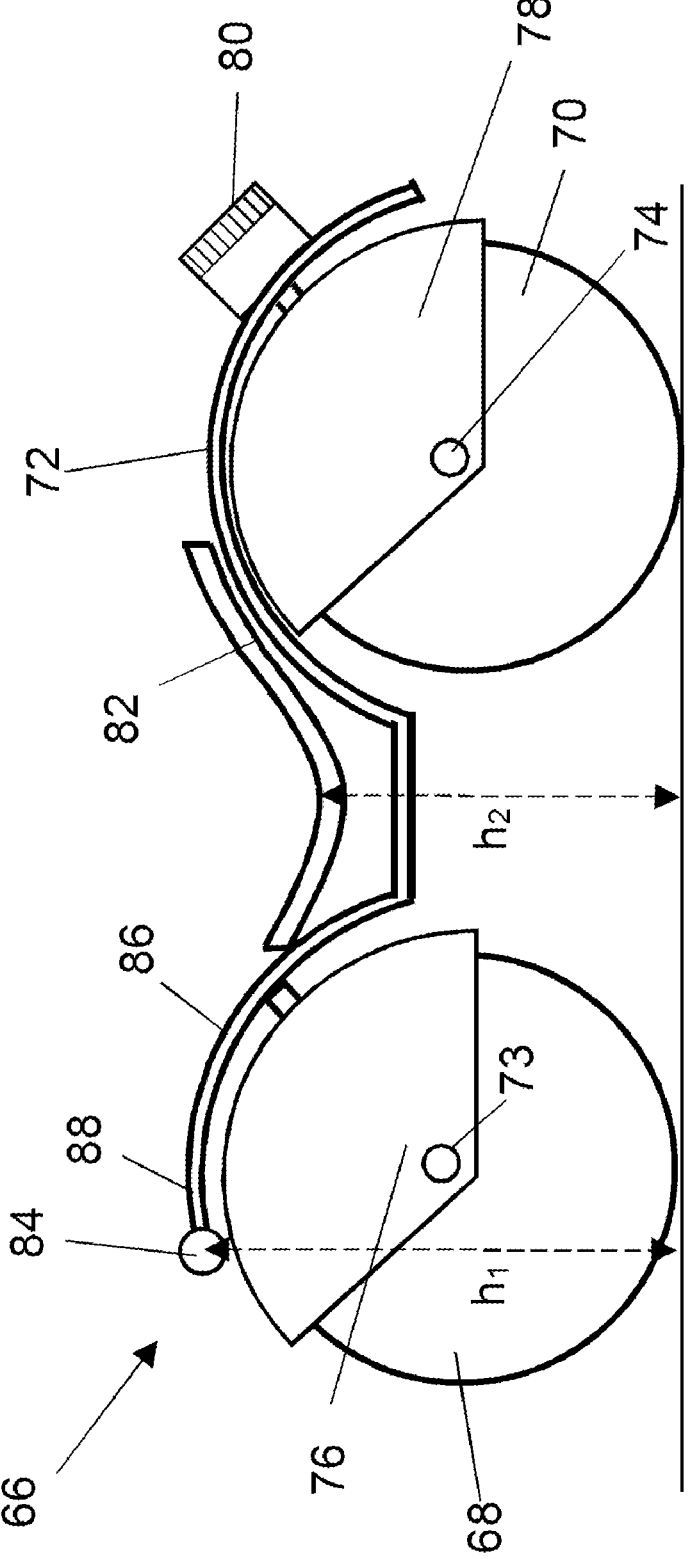
FIG. 5 shows a schematic side view of a bicycle in accordance with a further embodiment of the present invention.

FIG. 5 shows a further embodiment of a bicycle 66 in accordance with the invention. The bicycle 66 comprises similar features to the embodiment of FIGS. 1A-1C, including a front ground-engaging sphere 68 and a back ground-engaging sphere 70 mounted on a frame 72. Front and rear spheres 68, 70 are provided with respective axles 73, 74 defining transverse, fixed first and second axes about which the spheres rotate. The spheres 68, 70 are mounted in respective front and rear supports 76, 78, which comprise portions that are shaped as wedges of a spherical shell so as to define a cover for the spheres 68, 70 and have the appearance of a mudguard. The front and rear axles 73, 74 are directly mounted to the front and rear supports 76, 78.

The rear support 78 is pivotally mounted to the frame 72 in a similar manner to that described above with reference to FIGS. 1B and 1C, although this is not essential, and in accordance with some aspects and embodiments of the invention, the rear support may be fixedly mounted to the frame. However, in the present embodiment, the rear support 78 is pivotally mounted such that the rear sphere 70 can turn to allow the bicycle 66 to turn as it is propelled by the rider. The bicycle 66 is provided with an adjustable resilient biasing mechanism 80, which provides a force urging the rear sphere 70 back to a neutral position whenever it is turned. It is not essential for the resilient biasing mechanism to be adjustable, and in variants and other embodiments, it may have a fixed resilience (e.g. determined during manufacture). Such a non-adjustable resilient biasing mechanism may still have the same or a similar appearance to the adjustable resilient biasing mechanism. The adjustable resilient biasing mechanism 80 functions in a similar manner to the resilient biasing mechanism described above with reference to FIGS. 2 to 4.

The frame 72 is provided with a saddle-type seat 82 for the rider to sit on. The seat 82 is adjustable between different positions to allow the seat position to be changed to suit the rider, e.g. to adjust for height or age of the rider.

The bicycle 66 is provided with gripping portions in the form of handles 84 for a rider to grip while riding the bicycle 66. Similarly to the gripping portions 18 in the embodiment of FIG. 1A, the gripping portions 84 have a cylindrical handle shape in the embodiment of FIG. 5. However the position of the gripping portions differs from the embodiment of FIGS. 1A-1C. In the present embodiment, the gripping portions are provided lower down and farther forward (compared with the gripping portions of FIGS. 1A-1C).

It can be seen from FIG. 5 that the frame 72 has a shape that follows the contours of the front and rear spheres 68, 70, with a lower region between the spheres which supports the saddle-type seat 82. A front portion 86 of the frame 72 extends over the front sphere to a front end portion 88 which comprises the handles 84. In contrast with the embodiment of FIGS. 1A-1C, the front end portion 88 of the frame 72 does not project upwards of the frame 72. Instead, the front end portion 88 continues to follow the contour of the front sphere 68 such that it extends approximately horizontally over the front sphere 68 so that the gripping portions 84 are in a low position. It can be seen from FIG. 5 that the gripping portions 84 have a height $h_1$ above the ground and the lowest part of the seat has a height $h_2$ above the ground, where $h_1$ is approximately 135% of $h_2$. The bicycle 66 is of a size to suit a young child (e.g. less than three years old) who is learning to ride for the first time. In this example, $h_2$ is 0.4 meters, although other heights are possible. It can also be seen from FIG. 5 that the front end portion 88 projects forwards so that the gripping portions 84 are longitudinally forward of the axle 73 of the front sphere 68.

Having the gripping portions in this low, forward position may advantageously help a young rider to learn the ride the bicycle more quickly. This is because the gripping portions are too low and too far forward for the rider to reach when standing or when sitting upright on the bicycle. This encourages the rider to adopt a seated position where they are leaning forward to hold the gripping portions. This helps the rider to propel the bicycle forwards and to learn the motor skills associated with riding the bicycle, as discussed in detail above.

It will be appreciated that only two example embodiments have been described herein. Other embodiments and variations are possible within the scope of the invention, which is defined by the appended claims.

What is claimed is:

1. A vehicle comprising:

a frame;

a front ground-engaging sphere which is rotatable about a first axis which is transverse and fixed relative to the frame;

a rear ground-engaging sphere which is rotatable about a plurality of axes;

gripping portions connected to a front portion of the vehicle, for a rider to hold; and a support, wherein the support is connected pivotally to a rear portion of the frame and wherein the rear sphere is connected to the support for rotation about a second axis which is transverse and fixed relative to the support;

wherein the support is pivotal with respect to the frame about a third axis which extends downwardly and longitudinally of the vehicle, such that the support is pivotable through a range of positions, said range of positions including a neutral position wherein the first and second axes are parallel;

wherein the vehicle further comprises a resilient biasing mechanism configured to resiliently bias the support towards the neutral position; and wherein the resilient biasing mechanism is configured to convert a rotational motion of the support into a linear motion of a translatable member, wherein the linear motion of the translatable member applies a force to a resilient member of the resilient biasing mechanism, thereby applying a mechanical stress to the resilient member or increasing a mechanical stress applied to the resilient member.

2. The vehicle of claim 1, wherein the resilient biasing mechanism is configured to apply a biasing force to the support towards the neutral position, wherein the resilient biasing mechanism is adjustable to change a rate at which a magnitude of the biasing force increases with angular displacement of the support as the support rotates about the third axis.

3. The vehicle of claim 1, wherein the resilient biasing mechanism is adjustable to apply a preload mechanical stress to the resilient member or to change a preload mechanical stress applied to the resilient member.

4. The vehicle of claim 1, wherein the resilient biasing mechanism is configured to apply a biasing force to the support towards the neutral position, and wherein the resilient biasing mechanism is adjustable to a configuration in which the biasing force applied to the support has a magnitude that is sufficient to prevent any pivotal movement of the support.

5. The vehicle of claim 1, wherein the resilient biasing mechanism is configured to apply a biasing force to the support towards the neutral position, and wherein the resilient biasing mechanism comprises a twistable portion for adjusting the resilient biasing mechanism, wherein the resilient biasing mechanism is configured such that changing an angular orientation of the twistable portion changes the rate at which the magnitude of the biasing force applied to the support increases with angular displacement of the support by an amount corresponding to the change in angular orientation of the twistable portion.

6. The vehicle of claim 1, wherein the resilient biasing mechanism comprises a cam and at least one cam follower, wherein the cam and the at least one cam follower are configured to convert the rotational motion of the support into the linear motion of the translatable member.

7. The vehicle of claim 1, wherein the resilient biasing mechanism comprises a housing, wherein the housing contains at least one of:

the resilient member;

the translatable member;

a cam; and at least one cam follower.

8. The vehicle of claim 1, wherein the support is pivotally connected to the frame by a bearing, and wherein the resilient biasing mechanism is mounted over the bearing.

9. The vehicle of claim 1, wherein the support is shaped to provide a rear sphere cover for the rear ground-engaging sphere; the vehicle further comprising a front support, wherein the front support is fixedly connected to a front portion of the frame and wherein the front sphere is connected to the front support for rotation about the first axis, wherein the front support is shaped to provide a front sphere cover for the front ground-engaging sphere, and wherein at least one of the front sphere cover and the rear sphere cover is formed from a portion of a spherical shell.

10. The vehicle of claim 1, wherein the third axis passes through the rear sphere.

11. The vehicle of claim 1, wherein the third axis extends downwardly at an angle of from 30° to 60° to a vertical line passing through the point of connection of the support to the frame.

12. The vehicle of claim 1, wherein the third axis extends downwardly and forwardly from the point of connection of the support to the frame.

13. The vehicle of claim 1, wherein the rear ground-engaging sphere is rotatable about the third axis by a limited angle.

14. The vehicle of claim 1, comprising a seat for a rider positioned so that a rider sitting on the seat can propel the vehicle by the rider's feet engaging the ground.

15. The vehicle of claim 14, wherein the gripping portions are provided in a position such that, in use, a rider sitting on the seat cannot reach the gripping portions without leaning forward.

16. The vehicle of claim 1, wherein the vehicle is a ride-on foot-propelled vehicle and wherein the vehicle does not have pedals.

17. A resilient biasing arrangement suitable for use as a resilient biasing mechanism of a vehicle, wherein the resilient biasing arrangement is suitable for pivotally mounting a support therein, the support comprising a connecting member for mounting a spherical wheel, the resilient biasing arrangement comprising:

a resilient biasing mechanism; and a bearing for receiving the connecting member of a support in use;

wherein the bearing facilitates pivotal movement of the support in use about a rotational axis of the support through a range of angular positions including a first position; and wherein the resilient biasing mechanism is configured to bias the support towards the first position when the support is mounted in the bearing in use; and wherein the resilient biasing mechanism is configured to convert a rotational motion of the support into a linear motion of a translatable member, wherein the linear motion of the translatable member applies a force to a resilient member of the resilient biasing mechanism, thereby applying a mechanical stress to the resilient member or increasing a mechanical stress applied to the resilient member.

18. The resilient biasing mechanism of claim 17, wherein the resilient biasing mechanism is configured to apply a biasing force to the support towards the first position, and wherein the resilient biasing mechanism is adjustable to a configuration in which the biasing force applied to the support has a magnitude that is sufficient to prevent any pivotal movement of the support.

\* \* \* \* \*